Jan. 24, 1928.

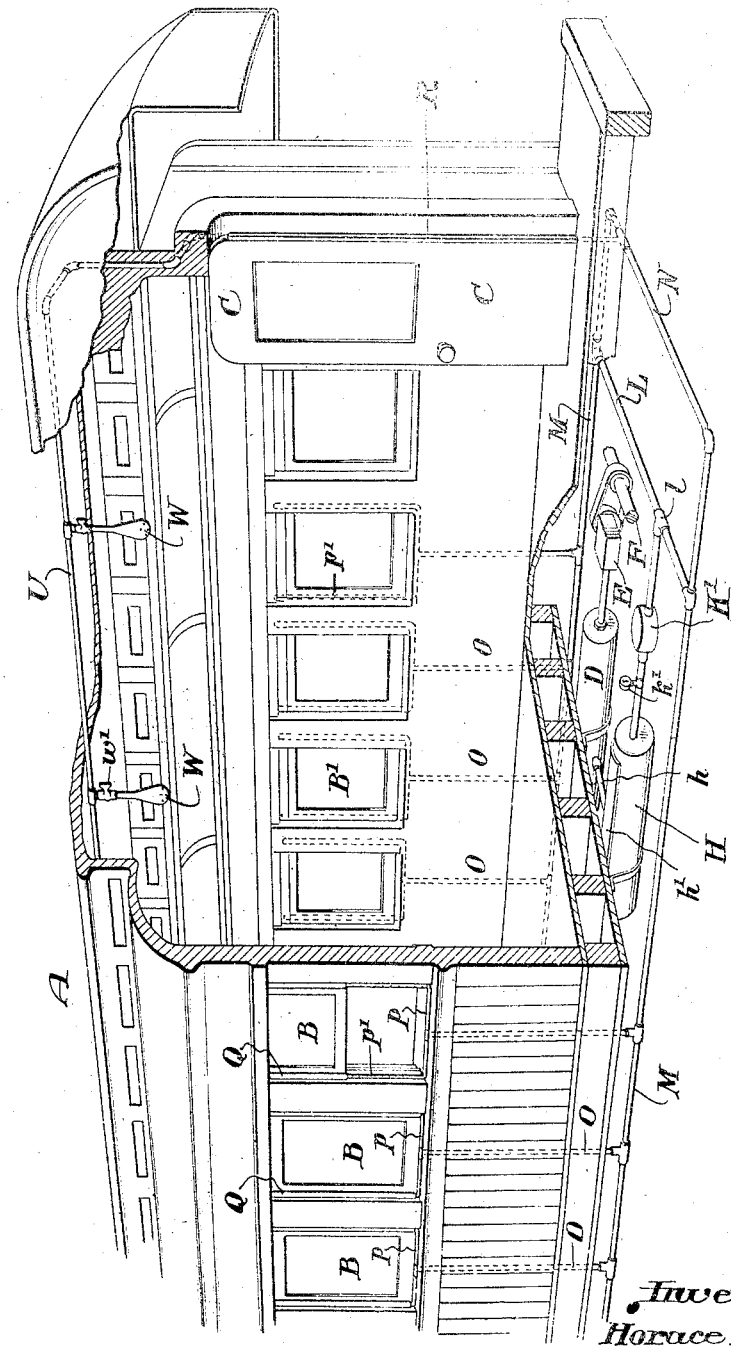

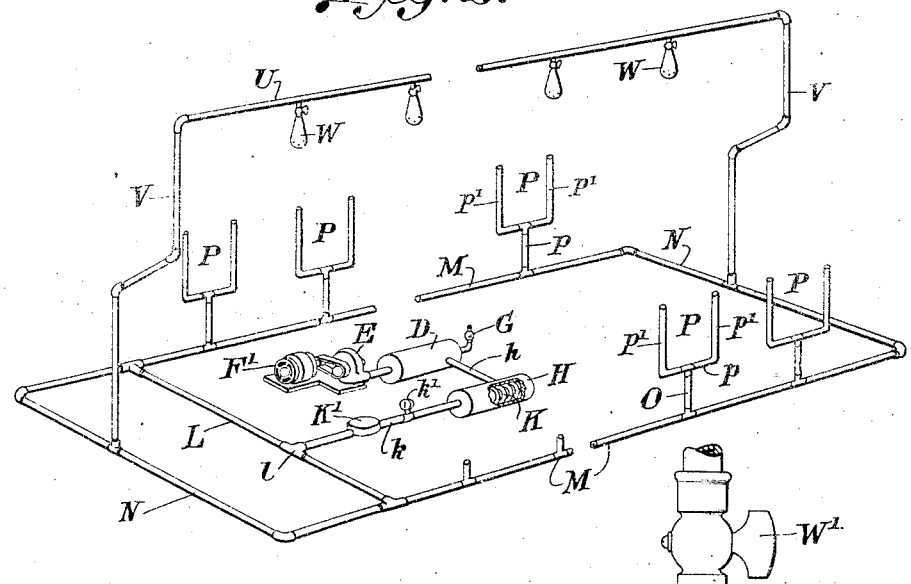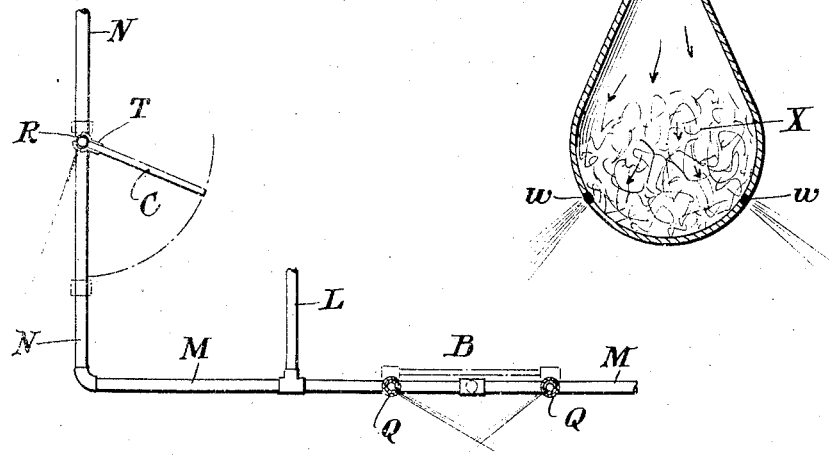

H. B. BURKE 1,657,066

VENTILATING SYSTEM

Filed Oct. 24, 1924    3 Sheets-Sheet 3

Inventor
Horace B. Burke
by his Attorneys

Patented Jan. 24, 1928.

1,657,066

UNITED STATES PATENT OFFICE.

HORACE B. BURKE, OF SHREVEPORT, LOUISIANA, ASSIGNOR TO BURKE COOLING & HEATING SYSTEM, INC.

VENTILATING SYSTEM.

Application filed October 24, 1924. Serial No. 745,617.

This invention relates to apparatus for purifying the air in railway cars, houses, and other structures by preventing the entrance of cinders, dust, insects and other such harmful substances or objects, and by introducing pure air thereto and discharging impure air therefrom.

According to my invention the windows, doors, or other openings in a car, house, or other structure are provided with novel devices whereby jets or sheets of air are discharged outwardly from the openings in such manner as to provide curtains or shields which prevent the entrance of foreign matter and which at the same time cause foul air to be withdrawn from the structure to give place to pure air.

Provision may also be made for introducing pure air to the interior of the structure and such air may be cooled in such manner as to afford a comfortable temperature.

In carrying out my invention in the way now best known to me, I provide a source of compressed air which is pipe connected with the devices for discharging air at the windows, doors or other openings and which is also pipe connected with devices for supplying air to the interior of the structure. Means is provided whereby the air discharge devices are automatically opened and closed when the closures of these openings are opened and closed. In the case of railway cars a tank for storing air under pressure is supported beneath the car body which is kept charged with compressed air supplied by a compressor operated either from the car axle or by an electric motor. Preferably air is conveyed from the compressed air tank to a second tank containing ice or other cooling medium by means of which the air is cooled before it passes into the pipe system or air line leading to the car windows, doors, etc.

At each window I provide vertical pipes which are connected with the air line and which are formed with perforations or slots through which air is expelled. These perforated pipes on the opposite sides of the window are so arranged as to discharge at an angle of 45° to thus produce air curtains or shields outside the windows. The pipes are rigidly attached to the jambs of the windows and the sashes are provided with tubes which fit over the perforated pipes and serve as sleeve valves for opening and closing the perforations, the arrangement being such that the air passage openings are opened and closed to the same extent that the window openings are opened and closed by the sashes. The doors of the car are associated with vertical pipes which are slotted or perforated through which air is discharged in such manner as to form a curtain or shield to prevent the entrance of dust, insects, etc., to the car and to withdraw foul air therefrom. I also preferably equip the car with devices arranged in the upper part of the car and also in other places to supply cool air to the car. My improvements are illustrated in the accompanying drawings, in which Figure 1 is a perspective view of a railway car equipped with my improvements.

Figure 2 is a diagram illustrating the pipe connections between the air supplies and the devices for discharging air at the windows, doors, and at other places in the car.

Figure 3 is a detail view showing one of the devices for supplying pure cool air to the interior of the car.

Figure 4 is a detail view of part of the air line indicating how it is connected with air discharge devices at one of the windows and one of the doors.

For purposes of illustration I have shown my invention in Figure 1 as being applied to a railway coach, but it will be understood that it is equally applicable to houses and other structures. A conventional type of railway coach is indicated at A, the windows being illustrated at B, and a car door at C.

A compressed air tank is shown at D, a compressor at E, and a car axle at F. The compressor may be operated from the car axle as indicated in Figure 1 or by an electric motor as indicated in Figure 2 at F'.

The tank D may be provided with a safety valve as indicated at G. The air line is indicated diagrammatically in Figure 2.

Figure 5:
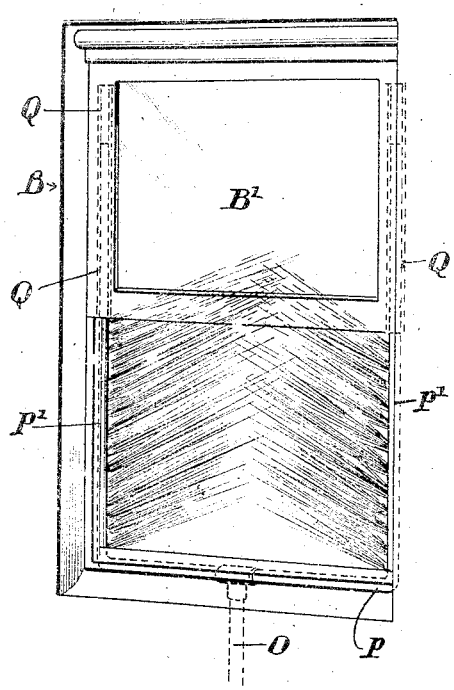
Figure 5 shows a car window equipped with my improvements and indicates how a curtain or shield of air under pressure is formed outside the window opening.

I preferably, though not necessarily, employ a second tank H to which air is conveyed by a pipe $h$ from the tank D. This tank H may be cooled in any suitable way as by ice introduced through an opening closed by cover $h'$. The pipe $h$ may be connected with a cooling coil K which is in turn connected with a pipe $k$ equipped with a gage $k'$ and an air pressure regulator $K'$. The pipe $k$ is connected at $l$ with a pipe L connected to longitudinal pipes M below the car body and these pipes M are connected with each other by transverse pipes N. The pipes L, M, N are all charged with air under pressure supplied in the manner before described and from these pipes L, M and N air is conveyed to the windows and doors of the car and also to the devices for supplying fresh pure air to the interior of the car. Vertical pipes O extend from the pipes M to the devices for producing air curtains at the windows. Each of these devices P comprises a bottom part $p$ and two perforated vertical pipes $p'$. The pipes $p'$ are secured to the window frames outside the window sash in the manner shown. Each sash B' has secured to it two tubes Q which serve as valves for opening and closing the perforations or openings in the pipes $p'$. These sleeve valves Q are rigidly secured to the sash B' and move upwardly and downwardly therewith. When the sash is in its lowermost position all of the perforations or openings in the pipes $p'$ are closed and no air is drawn from the pipe system. When the sash is raised as indicated in Figure 5 the sleeve valves Q uncover the openings in the pipes $p'$ and air escapes therefrom in the manner indicated. It is important to observe that the perforations or openings in the pipes $p'$ are uncovered proportionately to the distance the sash is raised. If the sash is raised half way, only the perforations in the lower parts of the pipes $p'$ are uncovered. If the sash is raised to its full extent, the perforations from top to bottom of the pipes will be thus opened. The pipes $p'$ are closed at their upper ends and when the sash B' is closed no air escapes from the air supply pipes at the window where the closed sash is located.

Figure 6:
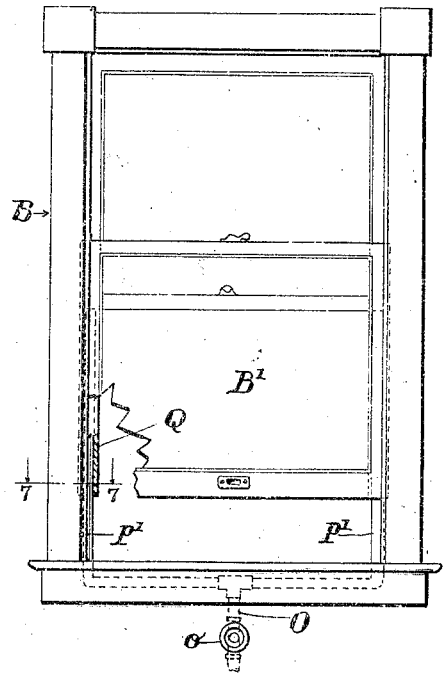
Figure 6 shows an ordinary house window indicating how my invention may be applied thereto.
Figure 7:
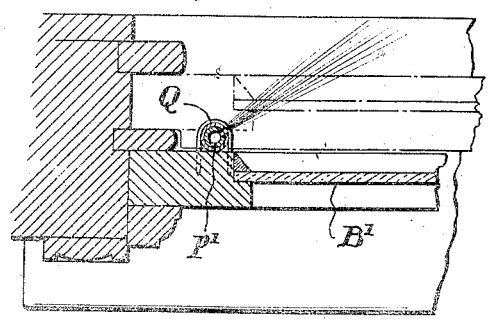
Figure 7 is a detail view in section on the line 7—7 of Figure 6, showing the invention applied to a house window.
Figure 8:
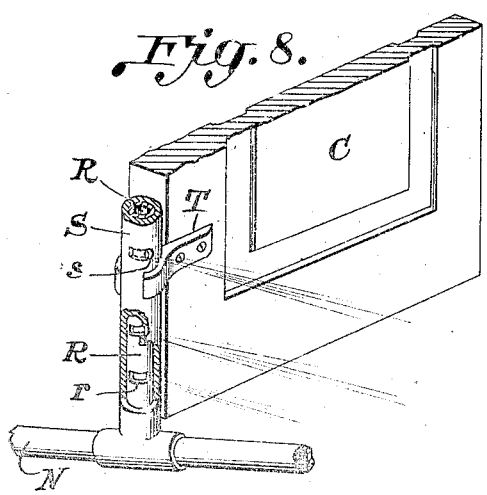
Figure 8 is a detail view illustrating how my improvements are applied to a door.

In Figures 6 and 7 I have illustrated how my invention may be applied to an ordinary house window and it will be observed that the construction of the device is substantially the same and needs no further description. In this case, however, the supply pipe O is preferably provided with a valve $o$ but the perforations or openings in the pipes $p'$ are in this case also opened and closed by means of sleeve valves Q. It will be understood that each of the car windows is preferably provided with the devices just described and each of the car doors C may be provided with means for discharging air in such manner as to prevent the entrance of insects, cinders, dust, etc. For this purpose I provide a vertically arranged pipe R which connects with a pipe N and extends along the inner edge of the door as indicated in Figure 8. This pipe R is provided with perforations or slots $r$ preferably arranged from top to bottom of the door. A tubular casing S surrounds the pipe R and this casing is attached to the door C by suitable devices T indicated in Figure 8. The tubular casing S is provided with slots or perforations $s$. The arrangement is such that when the door is closed the perforations $s$ do not register with the perforations $r$ and air is not discharged, but when the door is opened and the perforations $r$ and $s$ register or coincide air will be discharged in the manner indicated in Figure 4. By the devices described air shields or curtains may be provided at the openings in the car which not only serve to exclude foreign matter but which entrain air from the inside of the car and cause foul air or impure air to be discharged therefrom whenever a window or door is opened. I preferably also provide means for introducing pure air to the car body and this is preferably done by the means particularly illustrated in Figures 1 and 2. For this purpose I provide a horizontally arranged pipe U in the top of the car which is connected by pipes V with the air pipes N. At suitable intervals along the pipes U I provide discharge roses or nozzles W which are perforated at $w$ (see Figure 3). Each of these roses or nozzles is provided with a valve $w'$ by means of which any one of them may be cut off when desired or they can be all opened for conjoint use whenever necessary. I have found that the passage of air through the openings $w$ produces a hissing noise unless some means is provided for preventing it and I have found that by partially filling the bulb with steel wool indicated at X this hissing noise is practically eliminated; at any rate very greatly reduced.

My improvements were at first designed for use on railway cars, but I have since applied my improvements to the windows and doors of houses and other structures and so far as parts of my invention are concerned my improvements have a wide range of use.

I claim as my invention:

1. In a ventilating system, the combination with a structure having a window frame and upper and lower sashes mounted therein for vertical sliding movements, of vertically disposed tubes fixed to the lower portions of the frame and on opposite sides thereof, said tubes being formed with laterally disposed exit ports for directing air currents outwardly and toward each other, sleeves fixed to the lower sash and movable vertically therewith for cooperation with said tubes to open and close said ports upon the upward and downward movements of the lower sash, and means for directing compressed air into said tubes.

2. In a ventilating system, the combination with a car body having a plurality of windows arranged along its sides and including movable sashes, of a doorway located at one end of the body, a movable door associated with said doorway, a source of compressed air, means for directing a portion of said compressed air into the body of the car, means for directing other portions of said compressed air to said windows and door whereby said air will be directed laterally and outwardly across the windows and door when said windows and door are in opened position, and means respectively associated with said windows and doorway for controlling the exit of said air upon closing movements of said window sashes and door.

In testimony whereof, I have hereunto subscribed my name.

HORACE B. BURKE.